March 7, 1967    G. H. STUDTMANN, JR    3,308,371
STATIC INVERTER SYSTEM WITH ENERGY RETURN CIRCUIT
Filed May 31, 1963    3 Sheets-Sheet 3
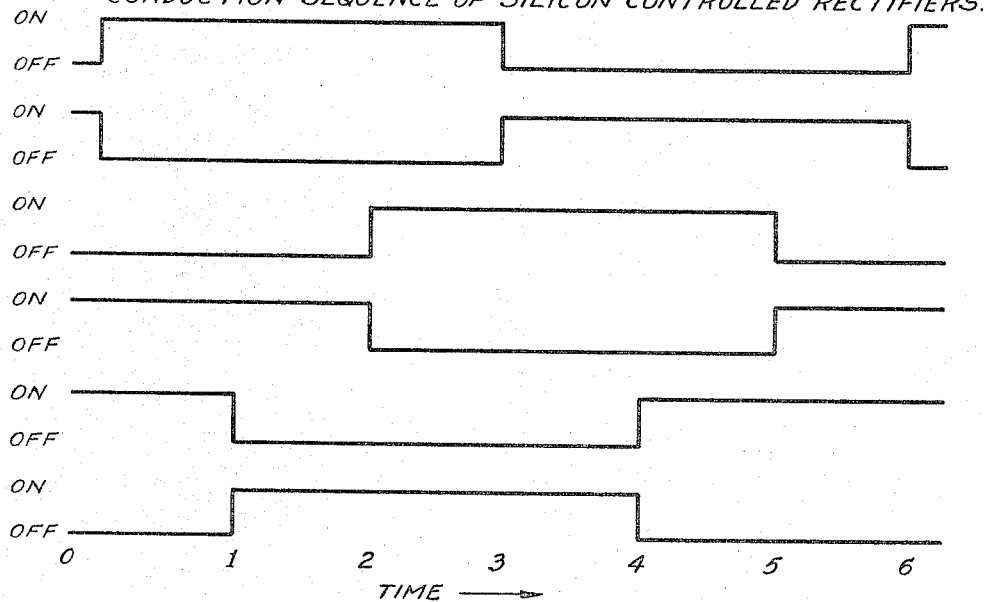
Fig. 11 — CONDUCTION SEQUENCE OF SILICON CONTROLLED RECTIFIERS.
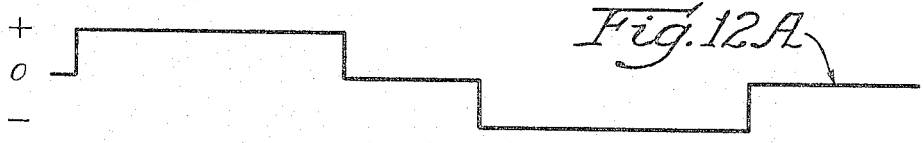
Fig. 12A
Fig. 12B
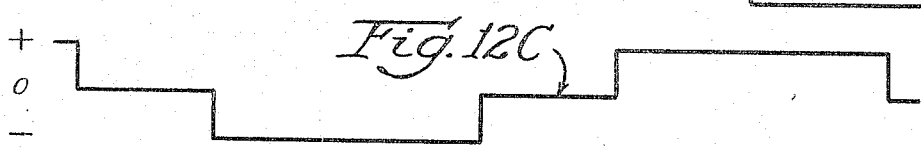
Fig. 12C
OUTPUT VOLTAGE WAVEFORMS.
Inventor:
George H. Studtmann, Jr.
By: James F. Jennings, Jr. Atty.

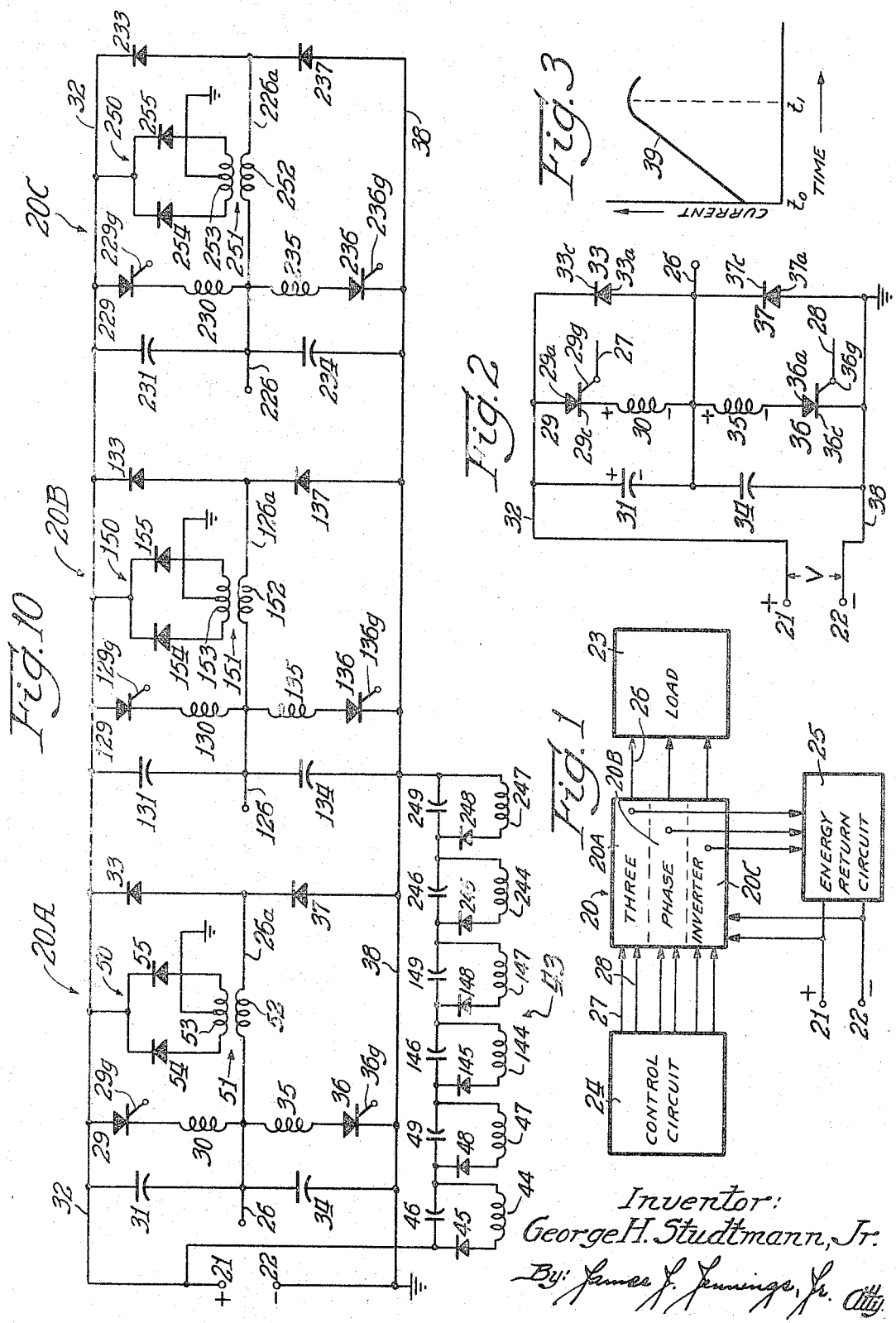

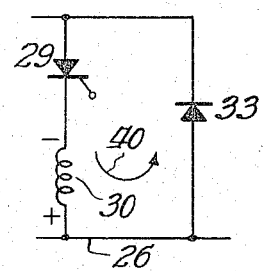
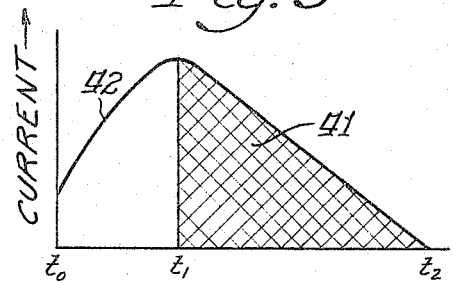
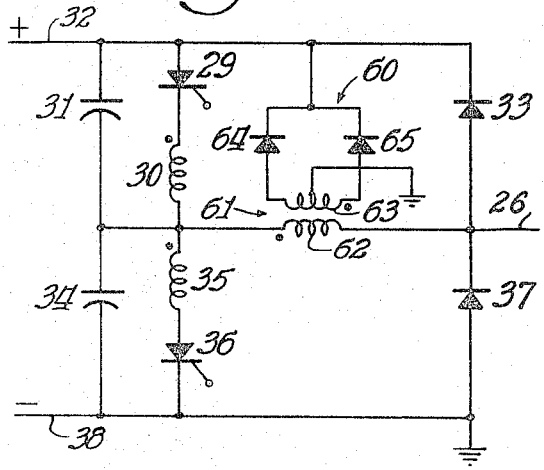
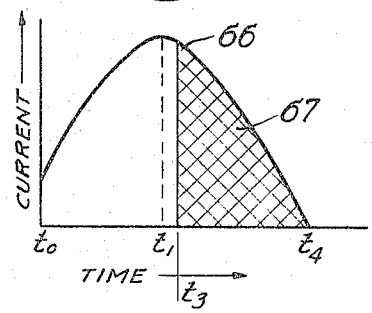
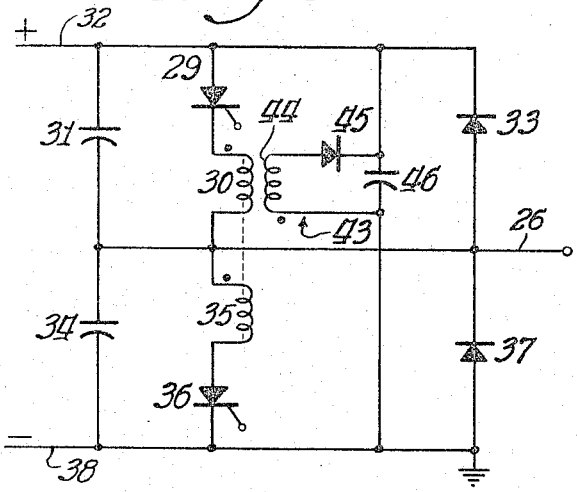
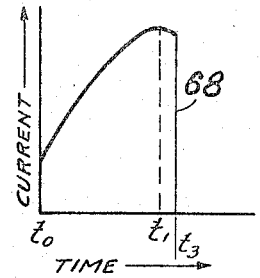

ary of the invention is to provide such

United States Patent Office 3,308,371
Patented Mar. 7, 1967

3,308,371
STATIC INVERTER SYSTEM WITH ENERGY
RETURN CIRCUIT
George H. Studtmann, Jr., Des Plaines, Ill., assignor to
Borg-Warner Corporation, Chicago, Ill., a corporation
of Illinois
Filed May 31, 1963, Ser. No. 284,672
5 Claims. (Cl. 321—45)

The present invention is directed to a static inverter which utilizes reactive commutating components, and more particularly to the recovery of energy from such components to obviate the wasteful dissipation of commutating energy.

An inverter in general is a system for converting direct-current (D.-C.) energy into alternating-current (A.-C.) energy. Generally such as system employs switching means operable periodically to reverse the direction of energy flow through a load, and the energy may be supplied from a battery or other D.-C. energy source. Thus the load "sees" an energy flow which alternates at a frequency determined by actuation of the switch (or switches). With the advent of semiconductor units, various systems have been devised utilizing semiconductors as switches and as protective elements to convert D.-C. power into A.-C. power. The initial advantages of fast switching time, negligible resistance when conducting, and light weight have been augmented by the development and use of high power semiconductor switches, such as silicon controlled rectifiers (SCR's). The term "static" is frequently applied to this type of system, in that no rotating machinery or other moving parts are required in the energy conversion. Thereafter attention has been directed to increasing the efficiency and reducing the cost of static inverter systems.

In a bridge inverter employing semiconductor switches, such switches must be turned on and off, and reactive commutating components such as capacitors and inductors are frequently used. Thus there is a significant amount of energy cyclically stored in these reactive commutating means, which energy is returned to the system to assist in transferring a semiconductor switch from the conductive to the non-conductive state, or from the non-conductive to the conductive state. The energy so returned is dissipated and wasted in the associated semiconductor switching units (and protective units, such as diodes) as certain units are shut off and other units are gated on. This power waste is largely incurred by the desirability of producing a square wave output signal. Such operation wastes energy, lowers the total power output and efficiency of the overall inverter system, and likewise causes unnecesary heating of the switching units, necessitating the use of SCR's or similar components with higher power and heat ratings.

It is therefore a primary object of the present invention to provide a static inverter system of substantially higher efficiency than has been realized with previous systems.

It is a corollary object of the invention to provide such a system in which unnecessary heating of the semiconductor switching components is minimized.

A more particular object of the invention is to provide, in a static inverter system utilizing reactive commutating components, means for returning the energy stored in such components to the input circuit from which energy is supplied to minimize waste and useless dissipation of such energy.

The foregoing and other objects of the invention are realized, in one embodiment, by providing an inverter system which includes semiconductor switching means operable between first and second states to convert D.-C. energy received over an input circuit into A.-C. energy for transfer over an output circuit toward a load. Also provided is means for initiating operation of the semiconductor switching means from one to another of such states and reactive means to augment this operation. The reactive means assists by cyclically storing energy and thereafter returning such energy to the system, for eventual dissipation by recirculation through the various components including the semiconductor switching means. In accordance with the present invention, circuit means are provided to obviate such dissipation by recirculation, by returning to the input circuit the energy cyclically returned or given up by the reactive means. Thus overheating of the components is minimized, the physical size and rating of the various components are likewise minimized for a given power requirement, and a more efficient system is produced.

In order to acquaint those skilled in the art with the best mode contemplated for making and using the invention, a detailed description thereof is set forth in connection with the accompanying drawings, in the several figures of which like reference numerals identify like elements, and in which:

FIGURE 1 is a block diagram of an inverter system modified in accordance with the present invention;

FIGURE 2 is a partial schematic diagram of a single phase circuit of an inverter system, and FIGURE 3 is a graphical representation, useful in explaining problems in this art which are effectively solved by the present invention;

FIGURE 4 is a partial schematic diagram, and FIGURE 5 is a graphical illustration, particularly useful in explaining the energy dissipation problem present in previous inverter systems with reactive commutating means;

FIGURE 6 is a schematic diagram of an inverter depicting, and FIGURE 7 is a graphical representation useful in understanding, one embodiment of the present invention;

FIGURE 8 is a schematic diagram showing and FIGURE 9 is a graphical illustration useful in understanding, another embodiment of the invention;

FIGURE 10 is a schematic diagram of a three-phase static inverter in which each phase incorporates a preferred embodiment of this invention; and FIGURES 11 and 12A–12C are waveform representations useful in understanding the operation of the circuit set forth in FIGURE 10.

INTRODUCTION

As depicted generally in FIGURE 1, a three-phase inverter is provided to convert D.-C. energy received from terminals 21 and 22, over an input circuit including electrical conductors, into A.-C. energy, which is then transferred over suitable load conductors to a load circuit 23. Typically the three-phase inverter comprises three separate phase circuits, designated 20A, 20B and 20C. As will be made clear hereinafter, each individual phase circuit likewise comprises two sub-circuits symmetrically arranged and intercoupled to conduct on alternate half cycles of operation. This alternate conduction is controlled by suitable gating signals developed in control circuit 24 and applied over individual conductors (for example, 27 and 28) to the sub-circuits of the three-phase inverter. The inventive system is particularly characterized by an energy return circuit 25, and certain components within three-phase inverter 20, which cooperate to transfer a substantial portion of the commutating energy, which would otherwise be uselessly dissipated, back to the D.-C. input circuit. To better understand the modification of the three-phase inverter 20 and the provision of energy return circuit 25, the problems posed by conventional circuits will first be explained in connection with the single phase circuit illustrated in FIGURE 2.

The individual phase circuit there shown can be considered as part of a three-phase system, such as represented by block 20A in FIGURE 1. Input D.-C. energy is applied from terminals 21 and 22 over the input conductors to the single phase circuit, and an output or load conductor 26 (the two other output conductors are not identified by number) is utilized to pass A.-C. energy toward the load. Input switching signals are received over conductors 27 and 28. The remaining four conductors intercoupling control circuit 24 and inverter 20 in FIGURE 1 are not related to the circuit in FIGURE 2, but are used to apply related gating signals to those semiconductor switches in phase circuits 20B and 20C.

From inspection of FIGURE 2 it is apparent that this phase circuit in effect comprises two sub-circuits, similar in disposition and intercoupling. Input control conductor 27 is coupled to the gating element of a semiconductor switching means 29, depicted as a silicon controlled rectifier having an input element or gate 29g, a cathode 29c, and an anode 29a. Cathode 29c is coupled through a reactive commutating means 30, depicted as an inductor or commutating winding, to load conductor 26, and a capacitor 31 is coupled between conductor 26 and energy input conductor 32, in its turn coupled to input terminal 21. A diode 33 has an anode 33a coupled to conductor 26, and a cathode 33c coupled to conductor 32.

The other sub-circuit in FIGURE 2 includes a capacitor 34, an inductive winding 35, a semiconductor switch 36, and a unidirectional current conduction means depicted as a diode 37. Inductive winding 35 is coupled to winding 30 of the other sub-circuit, as by winding these components on the same magnetizable core (not shown). A second energy input conductor 38 is coupled to anode 37a of the diode, to cathode 36c of switch 36, to one plate of capacitor 34, and to terminal 22 of the input circuit. The other plate of capacitor 34 and cathode 37c of the diode are coupled to load conductor 26, and this conductor is also coupled through winding 35 to anode 36a of SCR 36. Load conductor 26 can be considered as a portion of the A.-C. output circuit, and conductors 32 and 38 as a part of the D.-C. energy input circuit, for the inverter including the pair of sub-circuits shown in FIGURE 2.

In this explanation, the term "current" is used to describe an energy flow from a first plane of potential toward a second plane of potential, where the first plane is of a polarity positive with respect to that of the second plane. In that the operation of a silicon controlled rectifier is much like a latching switch, the terms "conducting" and "non-conducting," "open" and "closed," or "on" and "off" are used to describe the states or conditions of these switches in the following explanation.

It is initially assumed that switch 36 is closed or conducting, and that switch 29 is open. Although there is a small forward voltage drop, of the order of one volt, across SCR 36 when this switch is closed, this small drop does not significantly affect the excellent switching characteristics of the SCR. Accordingly load current flows from the load over conductor 26, winding 35, switch 36, and conductor 38 back to the input circuit or the load. With negligible resistance to current flow between conductors 26 and 38, there is also only a negligible charge accumulated across capacitor 34. However at this time switching means 29 is in effect an open circuit, and therefore capacitor 31 has been charged to approximately the voltage V appearing across terminals 21 and 22 of the input circuit, and the charge has the polarity indicated by the + and − signs. Under these initial conditions, it is assumed that a trigger or gating pulse is received from control circuit 24 (FIGURE 1) over conductor 27 and applied to gate 29g of switch 29 to turn this switch on.

Switch 29 becomes conductive, to complete a load circuit during this half-cycle of operation with load current flowing in the opposite direction over load conductor 26. After reversal, load current flows from input energy conductor 32, over switch 29, winding 30, and conductor 26 to the load. However, when the load being supplied by the inverter exhibits an inductive reactance, and as a practical matter the load (such as a motor) is very often of this nature, the component of load current previously flowing from the load over conductor 26 and through winding 35 does not immediately decrease to zero as switch 29 is gated on.

As switch 29 turns on, capacitor 31 immediately applies a potential difference across winding 30 of a polarity such as that shown by the + and − signs in FIGURE 2, and a potential difference of like polarity appears across winding 35, applying to SCR 36 the requisite voltage to effect shut-off of this switch. In addition, the load current previously flowing through winding 35 and switch 36 is transferred over the magnetic circuit between windings 35 and 30 to the upper sub-circuit. Further, some portion of the load current (prior to reversal) passes over conductor 26 and through capacitor 34 to conductor 38 as switch 36 is turned off, effecting a rapid charge of capacitor 34 toward the potential V.

The hold-off voltage applied across SCR 36 is maintained as capacitor 31 discharges over a path including conductor 32, switch 29, winding 30, and conductor 26 back to the other plate of this capacitor. This rapid discharge of capacitor 31 through winding 30 effects a rapid voltage rise across, and energy storage in, winding 30 (see FIGURE 3). The non-conductive state of switch 36 is swiftly reached after switch 29 is turned on. Accordingly with this switch turned on, negligible resistance to current flow is presented by switch 29 and winding 30, and capacitor 31 is substantially fully discharged during only a small time period at the beginning of this half-cycle of operation. The previously described charging of capacitor 34 is also augmented by current flow from terminal 21, over conductor 32, switch 29, winding 30, conductor 26, capacitor 34 and conductor 38 to terminal 22. When the next gating or switching pulse is applied over conductor 28 to gate 36g of switch 36, this semiconductor switch is turned on to initiate another half-cycle of operation similar to that just described.

With the initial conduction of switch 29 and the discharge of capacitor 31 through this switch and through winding 30, there is a build-up of current flow through winding 30 approximately similar to that indicated by curve 39 in FIGURE 3. Because of the electromagnetic transfer of load current from winding 35 to winding 30, and the rapid discharge of capacitor 31 over the circuit including winding 30, the current may rise from the steady-state level to a level two to three times the steady-state level. Energy is thus stored in the magnetic field around winding 30 between times $t_0$ and $t_1$, and thereafter energy is returned to the upper sub-circuit (as seen in FIGURE 2) as the level of the current flowing through winding 30 decreases toward the steady-state load level.

At time $t_1$ the level of current flowing through winding 30 reaches the maximum value. Because of the parallel intercoupling of capacitor 31 and winding 30 (with switch 29 presenting negligible impedance at this time), there is a tendency toward oscillation or ringing in this circuit. Accordingly as the level of current flowing through winding 30 begins to decrease after time $t_1$, in accordance with well known electrical principles the polarity of the potential difference appearing across winding 30 is reversed with respect to that indicated in FIGURE 2. Winding 30 then appears as a source of energy and attempts to return energy to the sub-circuit over a path including diode 33 and silicon controlled rectifier 29. Because these three components (29, 30 and 33) are of major interest in considering this return and dissipation of the energy cyclically stored in and returned from the field about winding 30, an explanation thereof will be set forth in connection with FIGURE 4.

As there shown, after the increase of current level through winding 30 has ceased and the current level has begun to decrease, the polarity of the potential difference then appearing across winding 30 is depicted by the + and − signs. Looking from winding 30 over conductor 26 toward the load, substantial impedance to current flow is seen. However, the forward drop of diode 33 when added to the drop across conducting SCR 29 is very small, of the order of two volts, and thus a circulating current flows as indicated by arrow 40 through these components and back to winding 30 to dissipate the cyclically stored and returned energy. The energy is dissipated principally in the heating of the diode and the silicon controlled rectifier, and this energy is represented by the cross-hatched area 41, shown between times $t_1$ and $t_2$ under curve 42 in FIGURE 5. Because of the large current-handling capacity of many silicon controlled rectifiers, the peak current may be of the order of three hundred to four hundred amperes and thus an appreciable amount of energy is wasted during the dissipation in the diode and the silicon controlled rectifier of the returned commutating energy. The level to which curve 42 rises is increased with a decrease in the load requirements, but even when the system is fully loaded there is a substantial heating of these components and energy waste. It is this heretofore wasted energy which is substantially reclaimed and returned to the input circuit with the present invention.

STRUCTURE OF THE INVENTION

As depicted in FIGURE 6, an energy return circuit 60 is provided for returning to the input circuit commutating energy which passes through windings 30 and 35 of the two sub-circuits which comprise the individual phase circuit there shown. Circuit 60 includes a transformer 61 having a primary winding 62 and a secondary winding 63, and a pair of diodes or rectifiers 64 and 65. In effect, the output or load conductor 26 is interrupted at a point between the common connection of coils 30 and 35 and another point at the common connection between diodes 33 and 37, and primary winding 62 of transformer 61 is intercoupled between these points in the circuit. Each end of secondary winding 63 is coupled to the anode of one of the rectifiers 64 and 65, and the cathodes of these rectifiers are coupled together and connected to input energy conductor 32. The center tap connection of secondary winding 63 is coupled to a plane of reference potential, conventionally represented as ground.

The operation of the circuit shown in FIGURE 6 is analogous to that described in connection with FIGURE 4, in that after SCR 36 is turned off and SCR 29 is gated on, capacitor 31 discharges over a path including winding 30 to effect the storage of electrical energy in the field about this winding. With respect to the upper sub-circuit shown in FIGURE 6, capacitor 31, winding 30, or the combination of these two components can be considered a reactive commutating means which stores energy (which may be received over input energy conductors 32 and 38 from a unidirectional force) and thereafter returns the energy to the associated sub-circuit. Return of energy from capacitor 31 occurs as it discharges, and occurs from winding 30 as the magnetic field thereabout collapses to return energy to the system.

The storage of energy in winding 30 as capacitor 31 discharges is represented by the initial sloping portion of curve 66 in FIGURE 7. It is evident from comparison with the illustration of FIGURE 5 that this initial energy storage in the magnetic field about winding 30 is similar to that previously described. However, as the level of current flow through winding 30 reaches a maximum and then begins to decrease, the polarity of the voltage appearing across winding 30 reverses and this winding appears as a source of energy, attempting to return the previously-stored energy to the upper sub-circuit including switch 29 and diode 33. The level of the current flow from winding 30 begins to diminish, and the induced voltage (represented by the product of the inductance value, $L$, of winding 30 times the change of current with respect to time, $di/dt$) begins to increase. This voltage appears across the circuit including conductor 26 and primary winding 62, diode 33, conductor 32, and SCR 29. An increasing voltage drop appears across primary winding 62 of transformer 61, and after this voltage drop reaches a preassigned level as determined by the physical size and turns ratio of the transformer, the voltage appearing across secondary winding 63 is such that the circuit "clamps" at a certain level and current flows through rectifiers 64 and 65 back to energy input conductor 32. At this time, represented by $t_3$ in FIGURE 7, current begins to recirculate through the upper sub-circuit.

A substantial portion of the cyclically returned energy is passed over the magnetic coupling arrangement, or transformer 61, and the rectifier means including rectifiers 64 and 65, back to the energy input circuit. The effect of this recirculating and energy return is depicted in the cross-hatched area under curve 66, referenced by numeral 67, which indicates that a significant reduction in heating of diode 33 and SCR 29 has been effected (see FIGURE 5). Moreover, the elapsed time for the return of stored energy is shown between times $t_3$ and $t_4$ in FIGURE 7, and this time is significantly less than the time period between $t_1$ and $t_2$ in FIGURE 5. It is not necessary to use a physically large transformer for unit 61 in FIGURE 6, in that the volt-time integral, or in effect the combination of the voltage that must be passed over transformer 61 and the time interval during which this voltage transformation occurs, is comparatively small. In other words, transformer 61 is designed to have a volt-time integral only long enough to insure that the commutating energy is returned. Accordingly, the arrangement depicted in FIGURE 6 provides an efficacious energy return circuit for returning to the input circuit of the inverter system energy cyclically stored and disgorged from the reactive commutating components of each sub-circuit, to increase the efficiency and decrease the heating of system components such as 29 and 33. It would be desirable to further increase the efficiency of the energy return circuit, and to reduce the cross-hatched area to zero, but some recirculation of the returned energy occurs in FIGURE 6 after the transformer provides a sufficiently high potential across secondary winding 63 to reach the clamping potential of this circuit arrangement.

FIGURE 8 illustrates another embodiment of the invention, showing an energy return circuit which substantially minimizes component heating. As there shown, an energy return circuit 43 is provided for returning commutating energy which passes through windings 30 and 35 of the two sub-circuits which comprise an individual phase circuit. Circuit 43 comprises a winding 44 magnetically intercoupled with windings 30 and 35, and a diode 45 having an anode coupled to one end of winding 44 and a cathode coupled to common conductor 32. A capacitor 46 is coupled between the cathode of diode 45 and the other end of winding 44. Capacitor 46 is coupled between conductors 32 and 38. It has been noted previously that windings 30 and 35 are magnetically intercoupled, and the requisite intercoupling of the coils or windings 30, 35 and 44 is readily effected by winding or positioning all three of these components on the same physical core (not shown).

Initially the operation of return circuit 43 at time $t_1$ (note FIGURES 3, 5 and 7) will be considered. After the level of current through winding 30 (FIGURE 8) has peaked and started to decrease, energy tends to be returned to the upper sub-circuit over a path including diode 33 and switch 29. The forward drop of these two semiconductors is small, of the order of about two volts. Accordingly the turns ratio between windings 30 and 44 is arranged, and diode 45 is provided, so that an effective clamping of the return circuit 43 occurs at a voltage level (across winding 30) less than the total voltage required to cause conduction across the components 33 and 29. By effectively clamping back through winding 30 at a potential lower than the voltage drop required for conduction around the sub-circuit, SCR 29 drops out of the recirculating path practically instantaneously. The energy in inductor 30 is stored in the magnetic field about windings 30, 35 and 44. As this magnetic field collapses, the voltage across winding 30 is maintained at the clamping level, and the voltage induced in winding 44 causes a current flow through diode 45 and an energy storage in capacitor 46. With the SCR dropped out, there is no recirculating current, for the commutating energy is not returned by recirculation but directly from the magnetic field. This rapid drop-out of SCR 29 is indicated by line 68 in FIGURE 9. Upon the alternate conduction of switches 29 and 36, energy is alternately passed from each of windings 30 and 35 through winding 44 to diode 45. When the level of energy fed back across winding 44 and stored in capacitor 46 exceeds the level of the unidirectional potential applied over the energy input conductors of the system, the stored energy is pumped back to either recharge the source or to be utilized in the energization of the phase circuits in the inverter system.

It is evident that certain practical considerations affect the design of energy return circuit 43. For example, if the source voltage is of the order of 110 volts and the secondary portion of return circuit 43 must clamp at approximately one volt, the turns ratio between windings 30 and 44 is exceedingly high. In addition, diode 45 must be provided with a very high peak inverse voltage rating to sustain the voltages applied thereacross during the commutation pulse as the capacitor discharges through its associated winding. Although FIGURE 8 shows another possible circuit for providing energy return from the reactive means or commutating windings 30 and 35, it is desirable to provide a more practical and less expensive energy return arrangement. Such an arrangement will be described in connection with FIGURE 10, which depicts phase circuits 20A, 20B and 20C of a complete three-phase inverter.

As there shown, phase 20A includes an additional circuit 50 coupled to the load conductor 26. Circuit 50 includes a transformer 51 having a primary winding 52 coupled between portions 26 and 26a of the load conductors. Transformer 51 has a secondary winding 53, with a center tap which is coupled to ground. Diodes 54 and 55 each have an anode portion coupled to one end of secondary winding 53, and the cathodes of diodes 54 and 55 are coupled to energy input conductor 32. If desired, a bridge rectifier circuit could be utilized in lieu of the illustrated arrangement of rectifiers 54 and 55.

It is again emphasized that the return of energy from the reactive commutating circuit including windings 30 and 35 is effected when this circuit is clamped at a potential less than that required for conduction around the remainder of the sub-circuit including either of these inductive windings. In accordance with the inventive concept, the turns ratio of transformer 51 is made such that the potential drop appearing across winding 52 (with switch 29 conducting) is greater than the clamping level of winding 30 as modified by the energy return circuit components coupled to winding 30. With this arrangement of circuit 50, the turns ratios of the magnetic coupling circuit including windings 30 and 35 in phase 20A and windings 44 and 47 of the energy return circuit 43 (all of these windings are magnetically coupled, as by being wound or positioned on the same core) can be made such that the potential at which windings 30 and 35 clamp is slightly less than the potential at which clamping would be effected across winding 52. It is understood that the circuits can be designed to operate at different clamping levels, depending upon the input voltage level and other design considerations. Thus the peak inverse voltage ratings of the diodes such as 45 and 48 in the energy return circuit can be reduced to effect further economies, and the return of stored energy from the commutating windings 30 and 35 to the source or input circuit can be effected in a shorter time.

With an energy return circuit such as that shown in FIGURE 8, a high voltage is applied through winding 44 to diode 45 as the commutating pulses occur in the illustrated circuit. To windstand these high inverse voltages, a rectifier with a very high peak inverse rating must be utilized. A string of diodes can be coupled in series between the top of winding 44 and conductor 32 to reduce the peak voltage applied to each diode, but this arrangement raises the difficulty of effecting an equal voltage distribution across each of the diodes. It has therefore been found preferable to utilize an energy return circuit 43 such as that illustrated in FIGURE 10. Windings 44 and 47 are magnetically coupled with windings 30 and 35 in phase circuit 20A, as by winding on a common core (not shown). The capacitors 46 and 49 are series coupled with the other four capacitors 146, 149, 246 and 249, and this entire bank of capacitors is coupled in parallel with conductors 32 and 38. This arrangement provides for equal division of the returned energy across the secondary portions of the energy return circuits, and reduces the peak inverse voltage which each diode must withstand during the time of the commutating pulse.

With the circuit illustrated in FIGURE 10, because the clamping voltage level across winding 52 is made higher than that across each of windings 30 and 35, in normal operation circuit 50 never clamps because return circuit 43 including windings 30 and 35 clamps first, to return the commutating energy to energy input conductors 32 and 38. However, with a reactive load, the tendency to maintain current flow may be such that the clamping level across winding 52 is reached, and some energy is returned over this circuit across diodes 54 and 55 to the input circuit. Similar operation may occur, of course, in each of the other phase circuits 20B and 20C. However, even if the clamping level across winding 52 is reached, manifestly one of the two windings 30 and 35 will also have reached the clamping level, to return energy through circuit 43 and effect the instantaneous drop-out of the SCR 29 or 36, so that there is no recirculating current forced around the sub-circuit for dissipation in the silicon controlled rectifier and its associated diode (33 or 37).

To assist those skilled in the art in making and using the invention, FIGURE 10 also indicates the intercoupling of phase circuits 20B and 20C with the input circuit including conductors 32 and 38 and terminals 21 and 22. Because the components of each of the second and third phase circuits 20B and 20C are identical in form and intercoupling with those of the phase circuit 20A, no explanation need be given for their structure and arrangement. To correlate these components with the related elements of the first phase circuit, reference numerals in the 100 series identify each component in phase 20B and characters in the 200 series identify corresponding components in phase 20C. For example, commutating winding 235 and semiconductor switch 236 in phase 20C are identical to winding 35 and switch 36 in phase 20A. Thus it will be understood that in energy return circuit 43, windings 144 and 147 are magnetically intercoupled in the same circuit with windings 130 and 135 in phase 20B. Accordingly in the operation of the three-phase circuit, the energy returned over the individual portions of return circuit 43 is stored in the bank of capacitors 46, 49, 146, 149, 246 and 249. The stored energy is returned to the input conductors for re-use in the inverter, rather than being wasted in the heating of switching and protective components.

In addition to the requisite unidirectional operating potential applied at terminals 21 and 22, appropriate square-wave switching potentials must be sequentially applied to the respective gates of the semiconductor switches identified as 29g, 36g, 129g, 136g, 299g, and 236g, to initiate operation of these switches from one to another of the "on" and "off" states (such operation is assisted by the reactive commutating means). Such switching potentials may be derived from well known arrangements such as the pulse generator 11 and logic circuit 12 illustrated and described in Patent No. 3,091,729, entitled, "Static Inverter," which issued to Edward M. Schmidt on May 28, 1963, and is assigned to the assignee of the present invention. The logic circuit has one stage thereof indicated in detail in FIGURE 2 of the patent, and the six individual conductors shown intercoupling the logic circuit with respective switching stages 13–18 are analogous to the conductors which would be coupled to the respective gates 29g–236g of the three-phase circuit in FIGURE 10 of this application. Because a bridge inverter arrangement is utilized in FIGURE 10, a power transformer with three-phase input connections (as shown in the patent) is not required, but instead the respective load conductors, 26, 126, and 226 are directly coupled to a load.

When the square-wave switching potentials are applied to the gates of the SCR's in FIGURE 10, their operation to a different condition or state is of the sequence indicated by the respective waveforms in FIGURE 11 of the drawings. To further assist those skilled in the art, FIGURES 12A–12C indicate the output voltage waveforms which appear between the load conductors. For example, FIGURE 12A depicts the output voltage waveform appearing between conductors 26 and 126; FIGURE 12B indicates the waveform of the output potential appearing between conductors 126 and 226; and FIGURE 12C depicts the voltage waveform which can be viewed with suitable indicating instruments between conductors 226 and 26.

To assist those skilled in the art in making and using a preferred embodiment of the invention, typical circuit values for the embodiment illustrated in FIGURE 10 are set forth below. It will be understood, however, that such typical values are given by way of illustration only and in no sense by way of limitation. In general, stock components were utilized, and the circuit arrangement can be made physically smaller and more economical as specially sized or designed components are utilized.

FIGURE 10—PHASE CIRCUIT 20A

| | |
|---|---|
| SCR's 29 and 36 | WX809H. |
| Diodes 33 and 37 | 1N1401. |
| Diodes 54 and 55 | 1N3212. |
| Diodes 45 and 48 | 1N1401. |
| Capacitors 31 and 34 | 120 μfd, 375 volts. |
| Capacitors 46 and 49 | 7 μfd (electrolytic). |
| Magnetic circuit including windings 30, 35, 44 and 47 | core, Arnold AA 122; primary windings (30 and 35) 12 turns, #6 sq. bifilar; secondary windings (44 and 47) 20 turns, #6 sq. single. |
| Magnetic circuit including Transformer 51 | core, EI 1¾ square core; primary, 14 turns, #7 sq.; secondary, 56 turns, #10 sq. |
| D.-C. potential at terminals 21, 22 | 120 volts. |

Although only particular embodiments of the invention have been illustrated and described, it is apparent that modifications and alterations may be made therein. It is therefore the intention in the appended claims to cover all such modifications and alterations as may fall within the true spirit and scope of the invention.

What is claimed is:

1. For use with an energy conversion circuit comprising a pair of sub-circuits, each sub-circuit including switching means and reactive commutating means series-coupled with said switching means, input circuit means coupled to said sub-circuits for supplying unidirectional electrical energy thereto, a common output conductor coupled to each of said sub-circuits, means for applying control signals to said switching means to initiate alternate operation thereof and transfer alternating energy over said output conductor, each of said reactive commutating means being effective to cyclically store and return energy to the respective sub-circuit in which it is coupled, the energy thus returned tending to be recirculated and dissipated in the sub-circuit including the associated switching means, and an energy return circuit comprising magnetic coupling means including said reactive commutating means, and rectifier means coupled between said magnetic coupling means and said input means, whereby the energy return circuit is effective to recover the energy stored in the reactive commutating means and returned therefrom, which energy would otherwise be dissipated in each sub-circuit by recirculation.

2. For use with an energy conversion circuit comprising a pair of sub-circuits, each sub-circuit including semiconductor switching means and inductive commutating means series-coupled with said switching means, energy input conductors coupled to said sub-circuits for supplying unidirectional electrical energy thereto, a common output conductor coupled to each of said sub-circuits, means for applying gating signals to said semiconductor switching means to initiate alternate operation thereof and transfer alternating energy over said output conductor, each of said inductive commutating means being effective to cyclically store and return energy to the respective sub-circuit in which it is coupled, the energy thus returned tending to be recirculated and dissipated in the sub-circuit including the associated semiconductor switching means, and an energy return circuit comprising magnetic coupling means including said inductive commutating means in each sub-circuit, and rectifier means coupled between said magnetic coupling means and said input means, whereby the energy return circuit is effective to recover the energy stored in the inductive commutating means and returned therefrom, which energy would otherwise be dissipated in each sub-circuit by recirculation.

3. For use with an energy conversion circuit comprising a pair of sub-circuits, each sub-circuit including switching means and reactive commutating means series-coupled with said switching means, input circuit means coupled to said sub-circuits for supplying unidirectional electrical energy thereto, a common output conductor coupled to each of said sub-circuits, means for applying control signals to said switching means to initiate alternate operation thereof and transfer alternating energy over said output conductor, each of said reactive commutating means being effective to cyclically store and return energy to the respective sub-circuit in which it is coupled, the energy thus returned tending to be recirculated and dissipated in the sub-circuit including the associated switching means, and an energy return circuit comprising first magnetic coupling means coupled to said common output conductor, first rectifier means coupled between said first magnetic coupling means and said input circuit means to effect clamping at a first level across said first magnetic circuit, second magnetic coupling means including said reactive commutating means, and second rectifier means coupled between said second magnetic coupling means and said input circuit means to establish clamping across said second magnetic coupling means at a second level lower than said given level, whereby the energy cyclically stored in the reactive commutating means and returned therefrom is returned to the input circuit means over said second magnetic coupling means to obviate dissipation of the returned energy by recirculation in each sub-circuit.

4. For use with an energy conversion circuit comprising a pair of sub-circuits, each sub-circuit including semiconductor switching means and inductive commutating means series-coupled with said switching means, energy input conductors coupled to said sub-circuits for supplying unidirectional electrical energy thereto, a common output conductor coupled to each of said sub-circuits, means for applying gating signals to said semiconductor switching means to initiate alternate conduction thereof and transfer alternating energy over said output conductor, each of said inductive commutating means being effective to cyclically store and return energy to the respective sub-circuit in which it is coupled, semiconductor diode means coupled in each sub-circuit, the energy thus returned from each inductive commutating means tending to be recirculated and dissipated in the sub-circuit including the associated semiconductor switching means and the semiconductor diode means, and an energy return circuit comprising a transformer having a primary winding coupled to said common output conductor and having a secondary winding, first rectifier means coupled between said secondary winding and said energy input conductors to establish clamping at a given level across said primary winding, magnetic coupling means including said inductive commutating means in each sub-circuit, second rectifier means coupled to said magnetic coupling means for establishing a clamping level across said inductive commutating means which is lower than said given level, and energy storage means coupled to said rectifier means and to said energy input conductors for returning the energy cyclically returned from the inductive commutating means over said magnetic coupling means.

5. An energy conversion circuit including an energy return circuit as defined in claim 4, in which said energy storage means comprises a plurality of capacitors all coupled in series between said energy input conductors, and a like plurality of magnetic coupling means and second rectifier means, thereby to reduce the peak inverse voltage applied to each second rectifier means.

References Cited by the Examiner
UNITED STATES PATENTS

| | | | |
|---|---|---|---|
| 3,120,633 | 2/1964 | Genuit | 321—45 |
| 3,120,634 | 2/1964 | Genuit | 321—45 |
| 3,131,343 | 4/1964 | Reinert | 321—45 X |

JOHN F. COUCH, *Primary Examiner.*

W. H. BEHA, *Assistant Examiner.*